US009450456B2

(12) United States Patent
Cook et al.

(10) Patent No.: US 9,450,456 B2
(45) Date of Patent: Sep. 20, 2016

(54) SYSTEM AND METHOD FOR EFFICIENT WIRELESS POWER TRANSFER TO DEVICES LOCATED ON AND OUTSIDE A CHARGING BASE

(71) Applicant: QUALCOMM Incorporated, San Diego, CA (US)

(72) Inventors: Nigel P. Cook, El Cajon, CA (US); Hanspeter Widmer, Wohlenschwil (CH); Lukas Sieber, Olten (CH)

(73) Assignee: QUALCOMM Incorporated, San Diego, CA (US)

( * ) Notice: Subject to any disclaimer, the term of this patent is extended or adjusted under 35 U.S.C. 154(b) by 617 days.

(21) Appl. No.: 13/913,036

(22) Filed: Jun. 7, 2013

(65) Prior Publication Data

US 2013/0270923 A1    Oct. 17, 2013

Related U.S. Application Data

(63) Continuation of application No. 12/427,318, filed on Apr. 21, 2009, now abandoned.

(60) Provisional application No. 61/046,757, filed on Apr. 21, 2008.

(51) Int. Cl.
*H01F 38/14* (2006.01)
*H02J 17/00* (2006.01)
*H02J 5/00* (2016.01)
*H02J 7/02* (2016.01)

(52) U.S. Cl.
CPC .............. *H02J 17/00* (2013.01); *H01F 38/14* (2013.01); *H02J 5/005* (2013.01); *H02J 7/025* (2013.01)

(58) Field of Classification Search
None
See application file for complete search history.

(56) References Cited

U.S. PATENT DOCUMENTS

| 3,743,974 A | 7/1973 | Sheffield |
| 4,799,066 A | 1/1989 | Deacon |
| 5,195,045 A | 3/1993 | Keane et al. |
| 5,297,664 A | 3/1994 | Tseng et al. |
| 5,340,968 A | 8/1994 | Watanabe et al. |
| 5,396,251 A | 3/1995 | Schuermann |
| 5,399,955 A | 3/1995 | Glaser et al. |
| 5,446,447 A | 8/1995 | Carney et al. |

(Continued)

FOREIGN PATENT DOCUMENTS

| CN | 1950914 A | 4/2007 |
| DE | 102007010896 A1 | 9/2008 |

(Continued)

OTHER PUBLICATIONS

Joung et al., "An Energy Transmission System for an Artificial Heart Using Leakage Inductance Compensation of Transcutaneous Transformer", IEEE Transactions on Power Electronics, vol. 13, No. 6, Nov. 1998, pp. 1013-1022.

(Continued)

*Primary Examiner* — Jared Fureman
*Assistant Examiner* — Aqeel Bukhari
(74) *Attorney, Agent, or Firm* — Knobbe Martens Olson & Bear LLP (57) ABSTRACT

A wireless power transmission system and method for transmitting power from a charging base to receivers located both on and outside the charging base. The system utilizes wireless power transmission of a transmitter with a wound transmit coil.

19 Claims, 7 Drawing Sheets

(56) References Cited

U.S. PATENT DOCUMENTS

| | | |
|---|---|---|
| 5,519,262 A | 5/1996 | Wood |
| 5,680,106 A | 10/1997 | Schrott et al. |
| 5,689,355 A | 11/1997 | Okubo et al. |
| 5,726,551 A | 3/1998 | Miyazaki et al. |
| 5,854,481 A | 12/1998 | Ricotti et al. |
| 5,991,608 A | 11/1999 | Leyten |
| 6,057,668 A | 5/2000 | Chao |
| 6,070,803 A | 6/2000 | Stobbe |
| 6,094,084 A | 7/2000 | Abou-Allam et al. |
| 6,127,799 A | 10/2000 | Krishnan |
| 6,134,130 A | 10/2000 | Connell et al. |
| 6,161,762 A | 12/2000 | Bashan et al. |
| 6,211,753 B1 | 4/2001 | Leifso et al. |
| 6,291,968 B1 | 9/2001 | Nantz et al. |
| 6,316,909 B1 | 11/2001 | Honda et al. |
| 6,321,067 B1 | 11/2001 | Suga et al. |
| 6,424,232 B1 | 7/2002 | Mavretic et al. |
| 6,427,065 B1 | 7/2002 | Suga et al. |
| 6,437,685 B2 | 8/2002 | Hanaki |
| 6,456,856 B1 | 9/2002 | Werling et al. |
| 6,480,110 B2 | 11/2002 | Lee et al. |
| 6,498,455 B2 | 12/2002 | Zink et al. |
| 6,515,919 B1 | 2/2003 | Lee |
| 6,556,415 B1 | 4/2003 | Lee et al. |
| 6,624,743 B1 | 9/2003 | Ikefuji et al. |
| 6,650,213 B1 | 11/2003 | Sakurai et al. |
| 6,840,440 B2 | 1/2005 | Uozumi et al. |
| 6,889,905 B2 | 5/2005 | Shigemasa et al. |
| 6,906,495 B2 | 6/2005 | Cheng et al. |
| 6,967,462 B1 | 11/2005 | Landis |
| 6,972,543 B1 | 12/2005 | Wells |
| 6,992,366 B2 | 1/2006 | Kim et al. |
| 7,009,860 B2 | 3/2006 | Kazutoshi |
| 7,023,395 B2 | 4/2006 | Ohara et al. |
| 7,084,605 B2 | 8/2006 | Mickle et al. |
| 7,167,090 B1 | 1/2007 | Mandal et al. |
| 7,256,695 B2 | 8/2007 | Hamel et al. |
| 7,283,922 B2 | 10/2007 | Kurtz et al. |
| 7,426,373 B2 | 9/2008 | Clingman et al. |
| 7,443,057 B2 | 10/2008 | Nunally |
| 7,495,414 B2* | 2/2009 | Hui .................. H01F 38/14 320/107 |
| 7,548,040 B2 | 6/2009 | Lee et al. |
| 7,570,220 B2 | 8/2009 | Hall et al. |
| 7,714,537 B2 | 5/2010 | Cheng et al. |
| 7,741,734 B2 | 6/2010 | Joannopoulos et al. |
| 7,762,471 B2 | 7/2010 | Tanner |
| 7,825,543 B2 | 11/2010 | Karalis et al. |
| 7,863,859 B2 | 1/2011 | Soar |
| 7,880,337 B2 | 2/2011 | Farkas |
| 7,975,921 B2 | 7/2011 | Mani et al. |
| 8,039,995 B2 | 10/2011 | Stevens et al. |
| 8,070,070 B2 | 12/2011 | Taniguchi et al. |
| 8,497,658 B2 | 7/2013 | Von Novak et al. |
| 2004/0000974 A1 | 1/2004 | Odenaal et al. |
| 2004/0130915 A1 | 7/2004 | Baarman |
| 2004/0204781 A1 | 10/2004 | Hsien |
| 2004/0227057 A1 | 11/2004 | Tuominen et al. |
| 2005/0068019 A1 | 3/2005 | Nakamura et al. |
| 2005/0127867 A1 | 6/2005 | Calhoon et al. |
| 2005/0131495 A1 | 6/2005 | Parramon et al. |
| 2005/0151575 A1 | 7/2005 | Sibrai et al. |
| 2006/0093998 A1* | 5/2006 | Vertegaal .................. G06F 3/011 434/236 |
| 2006/0158152 A1 | 7/2006 | Taniguchi et al. |
| 2006/0207753 A1 | 9/2006 | Sanatgar et al. |
| 2007/0021140 A1 | 1/2007 | Keyes et al. |
| 2007/0029965 A1 | 2/2007 | Hui et al. |
| 2007/0058402 A1 | 3/2007 | Shekhawat et al. |
| 2007/0103110 A1 | 5/2007 | Sagoo et al. |
| 2007/0164122 A1 | 7/2007 | Ju |
| 2007/0171681 A1 | 7/2007 | Baarman |
| 2007/0178945 A1 | 8/2007 | Cook et al. |
| 2007/0197180 A1 | 8/2007 | McKinzie, III |
| 2007/0207753 A1 | 9/2007 | Byun |
| 2007/0216348 A1 | 9/2007 | Shionoiri et al. |
| 2007/0236851 A1 | 10/2007 | Shameli et al. |
| 2007/0267918 A1 | 11/2007 | Gyland |
| 2007/0285255 A1 | 12/2007 | Tsushima et al. |
| 2007/0296548 A1 | 12/2007 | Hall et al. |
| 2007/0298846 A1 | 12/2007 | Greene et al. |
| 2008/0014897 A1 | 1/2008 | Cook et al. |
| 2008/0067874 A1 | 3/2008 | Tseng |
| 2008/0116846 A1 | 5/2008 | Greenfeld et al. |
| 2008/0116990 A1 | 5/2008 | Rokhsaz |
| 2008/0162973 A1 | 7/2008 | Landry et al. |
| 2008/0165074 A1 | 7/2008 | Terry |
| 2008/0191897 A1 | 8/2008 | McCollough |
| 2008/0211455 A1 | 9/2008 | Park et al. |
| 2008/0238364 A1 | 10/2008 | Weber et al. |
| 2008/0238632 A1 | 10/2008 | Endo et al. |
| 2008/0272889 A1 | 11/2008 | Symons |
| 2008/0315826 A1 | 12/2008 | Alberth, Jr. et al. |
| 2009/0058361 A1 | 3/2009 | John |
| 2009/0085522 A1 | 4/2009 | Matsumoto |
| 2009/0102292 A1 | 4/2009 | Cook et al. |
| 2009/0102296 A1 | 4/2009 | Greene et al. |
| 2009/0111531 A1 | 4/2009 | Cui et al. |
| 2009/0140691 A1 | 6/2009 | Jung |
| 2009/0146892 A1 | 6/2009 | Shimizu et al. |
| 2009/0153099 A1* | 6/2009 | Mahawili ............... H02J 5/005 320/109 |
| 2009/0160261 A1 | 6/2009 | Elo |
| 2009/0224608 A1 | 9/2009 | Cook et al. |
| 2009/0243397 A1 | 10/2009 | Cook et al. |
| 2009/0257259 A1 | 10/2009 | Leibovitz |
| 2009/0284218 A1 | 11/2009 | Mohammadian et al. |
| 2009/0284245 A1 | 11/2009 | Kirby et al. |
| 2009/0284369 A1 | 11/2009 | Toncich et al. |
| 2009/0286475 A1 | 11/2009 | Toncich et al. |
| 2009/0286476 A1 | 11/2009 | Toncich et al. |
| 2010/0038970 A1 | 2/2010 | Cook et al. |
| 2010/0073229 A1 | 3/2010 | Pattabiraman et al. |
| 2010/0123429 A1 | 5/2010 | Chen et al. |
| 2010/0148723 A1 | 6/2010 | Cook et al. |
| 2010/0309044 A1 | 12/2010 | Ische et al. |
| 2011/0234011 A1 | 9/2011 | Yi et al. |
| 2011/0241437 A1 | 10/2011 | Kanno |
| 2011/0266882 A1 | 11/2011 | Yamamoto et al. |
| 2012/0038220 A1 | 2/2012 | Kim et al. |
| 2012/0049642 A1 | 3/2012 | Kim et al. |
| 2012/0153731 A9 | 6/2012 | Kirby et al. |
| 2012/0262004 A1 | 10/2012 | Cook et al. |
| 2012/0299389 A1 | 11/2012 | Lee et al. |
| 2014/0139039 A1 | 5/2014 | Cook et al. |

FOREIGN PATENT DOCUMENTS

| | | |
|---|---|---|
| EP | 0977304 A1 | 2/2000 |
| EP | 1986304 A2 | 10/2008 |
| GB | 2422517 A | 7/2006 |
| JP | S56116738 U | 9/1981 |
| JP | H04361915 A | 12/1992 |
| JP | 06133476 | 5/1994 |
| JP | 8501435 A | 2/1996 |
| JP | 09044772 | 2/1997 |
| JP | 9103037 A | 4/1997 |
| JP | 09128110 | 5/1997 |
| JP | 10145987 A | 5/1998 |
| JP | H10280761 A | 10/1998 |
| JP | H11134566 A | 5/1999 |
| JP | H11508435 A | 7/1999 |
| JP | 11244864 A | 9/1999 |
| JP | 2001005938 A | 1/2001 |
| JP | 2001238372 A | 8/2001 |
| JP | 2001275278 A | 10/2001 |
| JP | 2001307032 A | 11/2001 |
| JP | 2001309579 A | 11/2001 |
| JP | 2002017058 A | 1/2002 |
| JP | 2002078247 A | 3/2002 |
| JP | 2002512000 A | 4/2002 |
| JP | 2002354712 A | 12/2002 |
| JP | 2003079076 A | 3/2003 |
| JP | 2004166384 A | 6/2004 |

(56) References Cited

FOREIGN PATENT DOCUMENTS

| | | | |
|---|---|---|---|
| JP | 2004215477 A | 7/2004 |
| JP | 2005110399 A | 4/2005 |
| JP | 2005110409 A | 4/2005 |
| JP | 2005149238 A | 6/2005 |
| JP | 2005208754 A | 8/2005 |
| JP | 2005261187 A | 9/2005 |
| JP | 2005300219 A | 10/2005 |
| JP | 2006314181 A | 11/2006 |
| JP | 2007089341 A | 4/2007 |
| JP | 2007125926 A | 5/2007 |
| JP | 2007282477 A | 10/2007 |
| JP | 2008508842 A | 3/2008 |
| JP | 2009500999 A | 1/2009 |
| KR | 20000011967 A | 2/2000 |
| KR | 20020005382 A | 1/2002 |
| KR | 20050013605 A | 2/2005 |
| KR | 20050016879 A | 2/2005 |
| KR | 20060122217 | 11/2006 |
| KR | 20070017804 A | 2/2007 |
| KR | 20070032271 A | 3/2007 |
| KR | 20070044302 A | 4/2007 |
| TW | I347724 | 8/2011 |
| WO | WO-9747065 A1 | 12/1997 |
| WO | WO-0195432 A1 | 12/2001 |
| WO | WO-2004032349 | 4/2004 |
| WO | 2004038887 | 5/2004 |
| WO | WO-2005053179 A1 | 6/2005 |
| WO | WO-2006011769 A1 | 2/2006 |
| WO | WO-2007008608 A2 | 1/2007 |
| WO | WO-2007089086 A1 | 8/2007 |
| WO | WO-2007090168 A2 | 8/2007 |
| WO | WO-2007095267 A2 | 8/2007 |
| WO | WO-2007119316 A1 | 10/2007 |
| WO | WO-2007150070 A2 | 12/2007 |
| WO | WO-2008017818 A1 | 2/2008 |
| WO | WO-2008133388 A1 | 11/2008 |

OTHER PUBLICATIONS

Karalis et al.,"Efficient wireless non-radiative mid-range energy transfer", Science Direct, Annals of physics, 323(1), pp. 34-48, (Jan. 2008).

Karalis et al., "Efficient wireless non-radiative mid-range energy transfer", MIT paper, publication and date unknown, believed to be 2007.

Karalis et al., "Wireless Non-Radiative Energy Transfer", MIT paper, publication and date unknown, believed to be 2007.

Kurs et al., "Wireless Power Transfer via Strongly Coupled Magnetic Resonances", Science Express, Jun. 7, 2007, pp. 83-86, vol. 317 No. 5834, DOI: 10.1126/science.1143254.

International Search Report and Written Opinion—PCT/US2009/041234, International Search Authority—European Patent Office—Dec. 14, 2009.

* cited by examiner

3 x LF RX integrated

FIG. 5A

3 x LF RX fold-out

FIG. 5B 2 x HF RX integrated

FIG. 5C 2 x HF RX fold-out

SYSTEM AND METHOD FOR EFFICIENT WIRELESS POWER TRANSFER TO DEVICES LOCATED ON AND OUTSIDE A CHARGING BASE

CROSS-REFERENCE TO RELATED APPLICATIONS

This application is a continuation of U.S. application Ser. No. 12/427,318, filed Apr. 21, 2009, which claims the benefit of U.S. Provisional Application No. 61/046,757, filed Apr. 21, 2008, both of which are hereby incorporated by reference in their entireties.

BACKGROUND

Our previous applications and provisional applications, including, but not limited to, U.S. patent application Ser. No. 12/018,069, filed Jan. 22, 2008, entitled "Wireless Apparatus and Methods", the entire contents of the disclosure of which is herewith incorporated by reference, describe wireless transfer of power between a transmitter and receiver.

The transmit and receiving antennas are preferably resonant antennas, which are substantially resonant, e.g., within 10% of resonance, 15% of resonance, or 20% of resonance. The antenna may be of a small size to allow it to fit into a mobile, handheld device where the available space for the antenna may be limited. An embodiment describes a high efficiency antenna for the specific characteristics and environment for the power being transmitted and received.

One embodiment uses an efficient power transfer between two antennas by storing energy in the near field of the transmitting antenna, rather than sending the energy into free space in the form of a travelling electromagnetic wave. This embodiment increases the quality factor (Q) of the antennas. This can reduce radiation resistance ($R_r$) and loss resistance ($R_l$).

The inventors noticed that many of the solutions raised by this system include power delivery at a distance, for example power delivery over inches or feet from a power transmitter to a receiver. The techniques disclosed in our co-pending applications allow delivery of power at reasonable efficiencies, for example between 3 and 5 feet, for example, and efficiencies from 5 to 40%.

SUMMARY

However, it was noticed that many users and/or manufacturers would actually prefer higher power-delivery efficiencies, and are willing to accept this power delivery at short distances. For example, many would prefer a power delivery solution which was over 90% efficient, even if that power delivery solution was less convenient to use. The inventors noticed that the resonant which have been used for delivery of power at a distance, could actually be used to produce very high efficiencies when used in a close contact situation.

An aspect describes a magnetically coupled resonance system, that includes a first pad surface against that accepts devices to be provided with power. The device uses the magnetically coupled resonance to provide power at a first efficiency of power transfer to devices on the pad surface. Power is provided at a second efficiency of power transfer, lower than said first efficiency, to other devices that are not on said first surface, e.g., devices that are remote from the pad by e.g., less than 12 inches or less than 3 feet.

The devices and pad can each use magnetically resonant circuits with antennas formed of an inductor formed by a coil, and a separate capacitor, tuned to an appropriate frequency.

The present application discloses use of these techniques to form a wireless desktop. The wireless desktop can be used to charge personal electronic devices such as communications terminals, cellular phones, or computer based peripheral devices these charged devices are either or both of powered or recharged, without wires, using a wireless energy transfer technique.

DETAILED DESCRIPTION

An embodiment uses coupled magnetic resonance using magnetic field antennas. Embodiments may operate at any frequency, but two embodiments may operate either at LF (e.g. 135 kHz) or at HF (e.g. 13.56 MHz), but at short distances. One embodiment uses a loop coil in series with a capacitor as the antenna. In one embodiment, the receiver part (e.g., the portable device) is intended to be placed directly on the pad. In this embodiment, there is a relatively small, fixed distance between the transmitter and receiver. That fixed distance, for example, may be set by the thickness of the material of the pad and the material of the housing. This may be less than a centimeter or less than 10 mm, between the coils forming the transmitter and receiver. The distance will be constant, so the item is always the same distance from the antenna when pressed against the pad.

That fixed distance is dependent on the geometry of the pad and the geometry of the charged item. In the embodiment, the antenna can be tuned to have a maximum response at that constant distance. This tuning, as well as other tuning operations described in this specification, can be calculated and then optimized by trial and error, for example.

However, unlike other close-charging systems, this system can also charge items which are located at a distance, e.g., inches or feet from the antenna. The antenna is less efficient when charging at a distance, but will still provides power at that distance. That allows charging of items that are not directly placed on the charging pad—unlike pure inductive systems which provide in essence no charge at all other than at the very specific fixed distance and/or orientation.

This produces certain advantages, including the ability to use less precision in the placement of the device on the charging pad. Even if the device is placed off the pad, it will still receive charging at a lower level from proximity. The lower level charge can be, for example, between 0.05 watts and 0.25 watts, for example, even when the device is not precisely placed on the pad.

To utilize desktop space efficiently and to reduce desktop wiring, the antenna of the power transmitter/power base may be incorporated into a host device that normally exists on a desktop. Embodiments describe that host device as including either a PC monitor or a lamp, but can be any other item, such as a printer, scanner, fax machine, telephone, router, or the like.

The transmitter unit may be powered directly from the 110/230 VAC supply already existing in this host device, thus not requiring an extra power cord or power connection.

Figure 1:
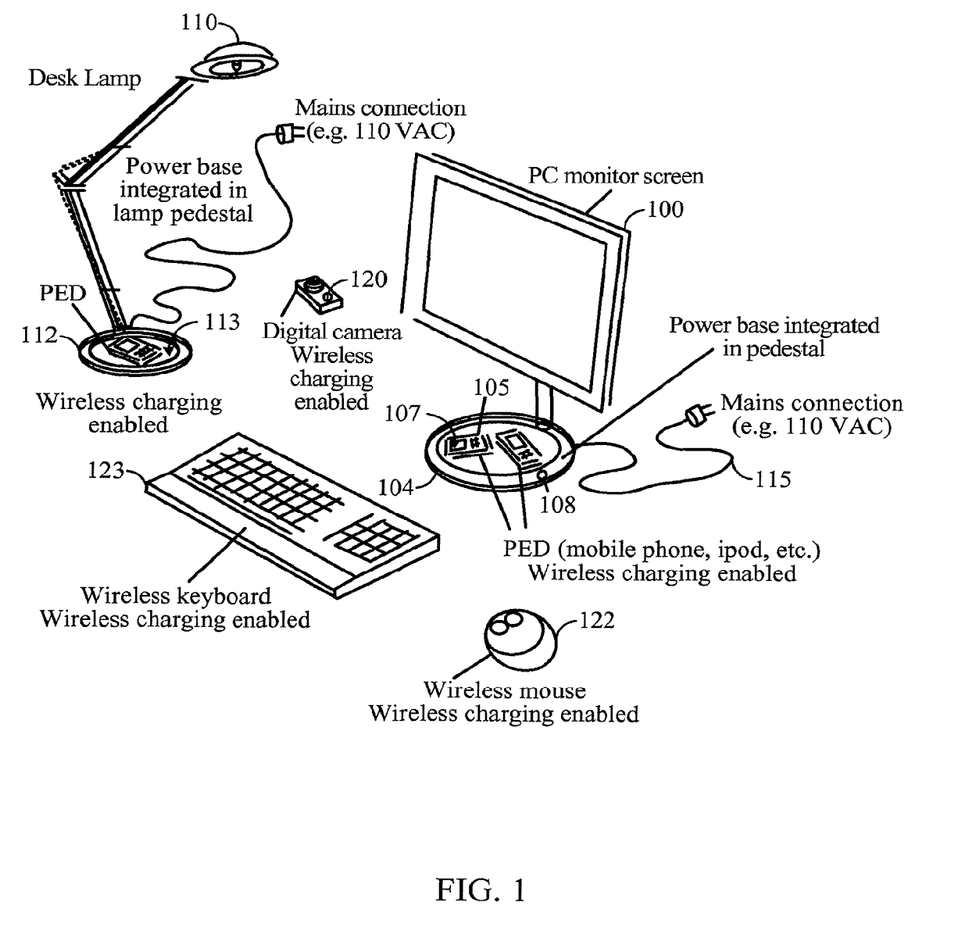
FIG. 1 shows a wireless desktop with wireless powered items.
Figure 7:
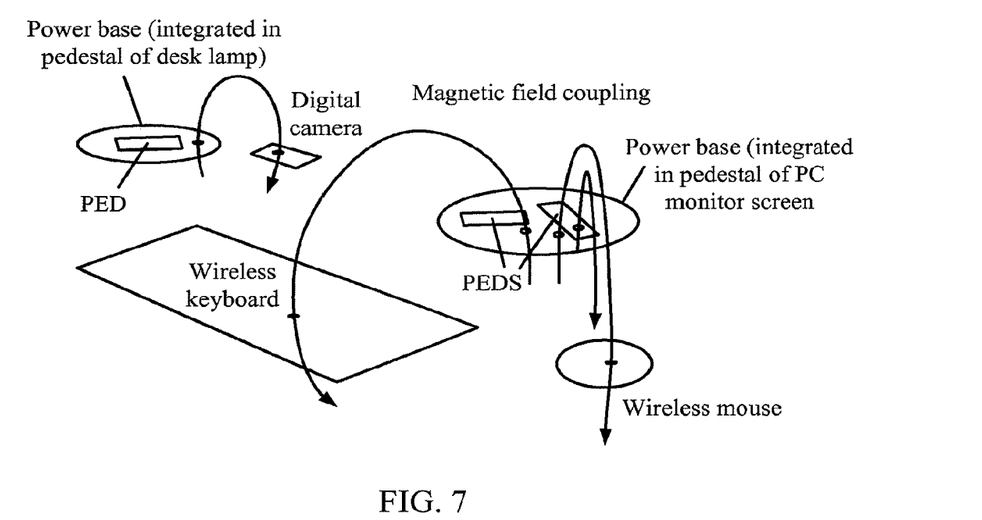
FIG. 7 shows coplanar field coupling using parasitic.

In one embodiment, as shown in FIG. 1, the transmit antenna is embedded in the pedestal 104 of a PC monitor screen 100 or in the pedestal 112 of a desk lamp 110. The pedestals may be disk-shaped, to house a circular wire loop antenna generating a symmetric magnetic field. This field is mostly vertically polarized at any position on the desk, in the plane of the antenna loop. This embodiment favors coplanar orientation of antenna loops integrated in wireless-power-enabled devices; that is, the best power-transfer will be obtained when a loop coil in the receiving device is oriented in a substantially parallel plane to a loop coil in the transmitting device. The surface of the charging base may be substantially parallel with the coil, so that the coplanar relationship can be maintained. FIG. 7 illustrates how the coplanar operation can extend to all the items on the desktop.

This coplanar orientation can be used, for example, for wire loop antennas integrated into keyboards, mouse devices, and into many other electronic devices such as mobile phones, MP3 players, PDAs, etc. if placed in the usual manner. This may, however, be used in other applications.

In another embodiment, there may be more than one power base on a desktop as shown in FIG. 1. Power is supplied from the base that is closest to the receiving device or from multiple different sources.

Each power base may also provide an area to place devices directly on the wire loop antenna, resulting in strongest coupling, thus enabling high power transfer at high efficiency. This close proximity coupling is attained by providing a surface 105, for example, adjacent the charging coil. In this embodiment, more than one device may be placed on such a charging pad surface 105. This has the other advantage of allowing a larger coil for the transmitting, which also provides improved efficiency.

Low power devices with long battery autonomy, such as a keyboard or a computer mouse, may be placed in the proximity or vicinity of a power base to charge by proximity coupling. Available power and transfer efficiency for these devices will be lower than for the fixed distance coupling. However, these devices may be constantly charged, and intermittently used. Hence, these devices do not require continuous charging. In one embodiment, the amount of charging may be reduced when other devices are additionally placed on the charging pad, because the multiple devices may more heavily load the system than a single device.

Magnetic field strength in the vicinity of a power base will preferably be below safety critical levels. The power base may additionally provide a function to automatically reduce magnetic field strength if a person is approaching. This function may use infrared or microwave person detection 108. This can be a proximity detector, e.g., one that can be activated by user proximity.

A first embodiment actuates the proximity detector manually. Persons that feel uncomfortable in presence of magnetic fields can turn on the function. This function will can also cause devices in the vicinity to stop receiving power during the time when persons are in proximity. This may use, for example, an IR detector to detect the presence of persons.

Another embodiment may always have the proximity detector active and automatically turn off the function when Other devices such as cordless phones, digicams, etc. may be placed on a charging station. This allows the wireless power receiver and its antenna to be made an integral part of the recharging station. A charging station may provide more area and/or space to integrate an efficient power receiver other than the portable device itself. For example, this may use electrical contacts, or by using a wireless technique or a wireless parasitic antenna, as described herein. The charging station itself may be configured and used as a power relay or a parasitic antenna that improves coupling between the transmitter and the portable devices which receive the charge.

In an embodiment, shown in FIG. 1, there may be a number of different electrically operated devices on a user's "desktop", which may be items used by a user for work every day. One such item is a monitor 100 for a PC. This operates off power provided by a 110 V connection 102 which plugs into the AC outlet. The 110 V connection 100 provides power for both the operation of the monitor, and also provides the power for the wireless surface 104 that is integrated into the base of the monitor. The charging pad may use the techniques that are described in detail herein.

Wireless proximity charging may be enabled in the area 105, which forms a flat surface on the base. According to this embodiment, the wireless proximity charging may be specifically tuned for short distance connections, although it may also operate properly over longer distance connections. Surface 105 may be sized such that devices such as cell phones and PDAs such as 107 may be rested on the surface. While charging is optimized for the area 105, charging is still carried out in other areas.

In this embodiment, there is also another charging base as part of a desk lamp 110. This forms a charging base 112 with an area 113 thereon. As in the 104 charging base, the charging is optimized for carrying out up close proximity charging of items such as 114 using magnetically coupled resonance. It may also charge items that are distant from the charging base.

In addition to charging items such as 114 on the charging base, either or both of the items produces magnetically resonant output power that is coupled to remote devices that are enabled for wireless charging. These remote devices, for example, may include a magnetically resonant antenna therein that is resonant to the same frequency of the transmission. In an embodiment, this may be at 13.56 MHz or at 135 Khz, or at any other frequency.

The charged devices can include a digital camera 121, a wireless mouse 122, and a wireless keyboard 123. Each of these devices, for example, can include a battery therein, which is charged by the operation of the device.

An important feature is that an up close charge can be carried out at high efficiency, or a distance charge can be carried out lower efficiency.

Figure 2:
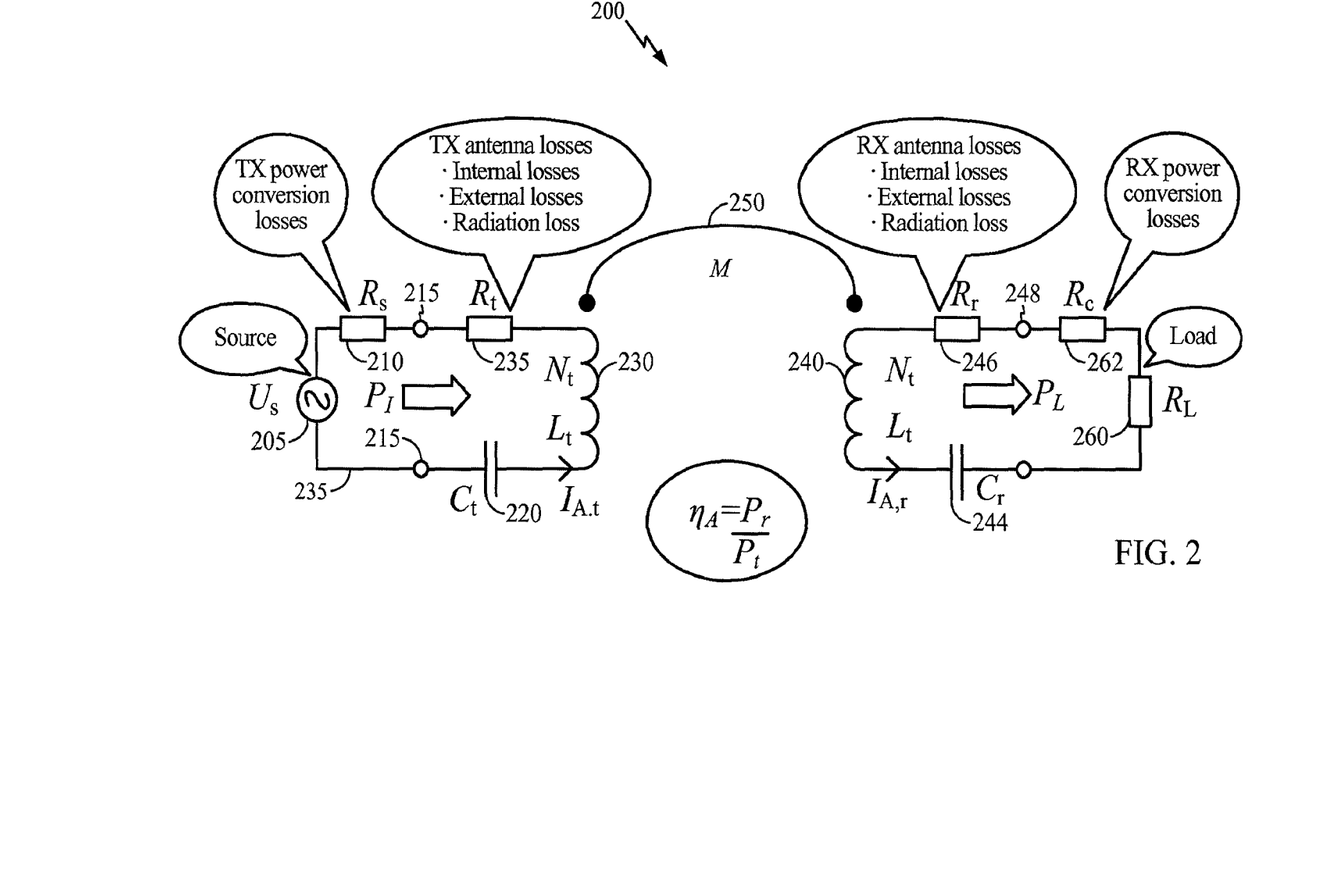
FIG. 2 shows an equivalent circuit.

FIG. 2 shows an equivalent circuit of the power transmission system, and illustrates how the efficiency can be calculated. A power source 200 portion includes a power source 205, for example the AC socket. The power source 205 has an equivalent loss resistance 210. The loss resistance 210 models the resistance and power conversion losses. Alternatively, the power source can include some parts of the conversion electronics, for example in the case that the power from the power source is changed to some other frequency or some other power value.

The power source 205 is connected across terminals 215, to antenna part 220. Antenna includes an inductor 230 and series capacitance 235. The LC constant of the inductor and capacitance is tuned to be substantially at the frequency of the source 205. The antenna also has shows a loss resistance value 235, which is a parasitic value that represents the transmit antenna losses, including internal losses, external losses, and radiation losses.

A magnetic field 250 is created in the vicinity of the antenna 230. This is coupled to the antenna 240 of the receiver. As in the antenna 230, the antenna 240 includes an inductor 242 capacitor 244. The inductor and capacitor form a circuit that is resonant with the received frequency that is received.

Receive antenna losses are shown by the series resistance 246. The input power $P_r$ is connected via the terminals 248 to a load 260. The load 260 also includes receive power losses 262 shown as a series resistance, which can be modeled as losses in the system.

These losses can include the power conversion losses as well as series resistance losses.

Another system can attempt to obtain maximum efficiency in various different scenarios. For example, in one scenario, the transmit antenna can be tuned by changing the capacitance to obtain resonance at the operating frequency in the presence of an unloaded receiver. In an unloaded receiver scenario, the resistance of the load is infinite. Loaded receivers change this resistance. Receiver measurements can also be carried out, by tuning the receiving antenna to change the capacitance etc. in the presence of an unloaded transmitter or in the case of multiple transmitters.

The different values can be measured. Capacitance value adjustments can be available, for example, for unloaded, moderately loaded (e.g, a single load) or highly loaded systems. Different capacitance values can be dynamically switched to create the highest efficiency value, and to operate with that value.

Figure 3A:
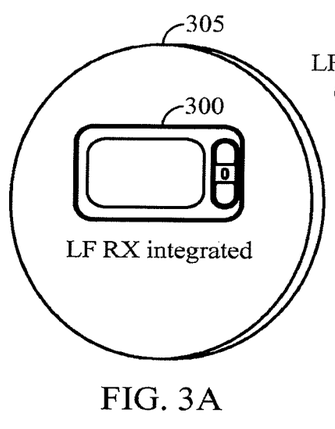
FIGS. 3A-3F show single receivers on pads with and without foldouts.

FIGS. 3A-3F show different scenarios of charging. FIG. 3A shows a conventional PDA 300 on a large charging pad 305. In the embodiment, this may be a low-frequency charging pad which may have a 26 cm diameter. Another embodiment may use a PDA 310 which includes a foldout antenna portion 315. The foldout antenna portion 315 may include a loop antenna that can be folded away from the body of the device to improve the coupling efficiency.

Figure 3B:
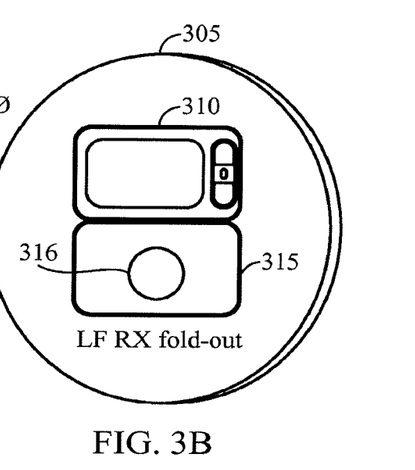
Figure 3C:
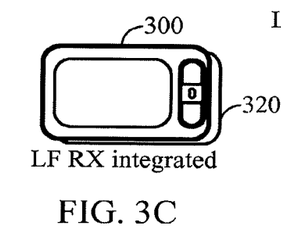
Figure 3D:
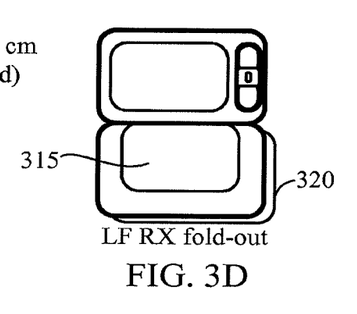
Figure 3E:
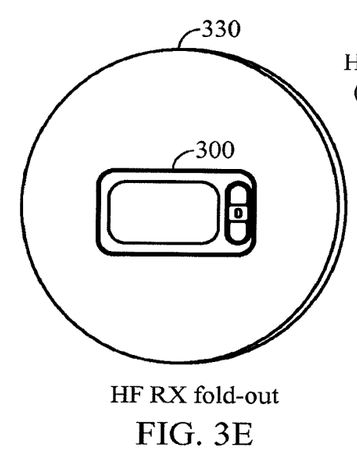
Figure 3F:
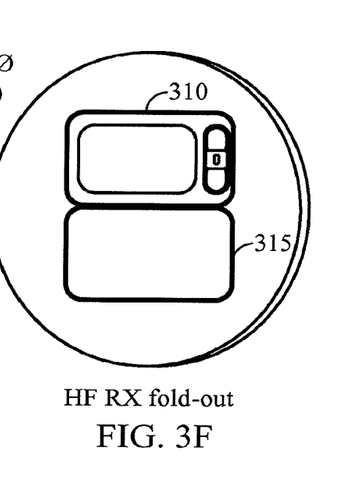

FIG. 3C shows a small pad embodiment, where the pad 320 is substantially the same size as the PDA 300. In this embodiment, the pad may be 6×9 cm. FIG. 3B shows how this pad might be used with a foldout embodiment, where the flap 315 fits directly over the pad 320. A medium pad is shown in FIGS. 3E and 3F. In this embodiment, the medium pad 330 includes the PDA 300 thereon, or a foldout PDA 310 with its foldout flat. The medium pad may be 18 cm in diameter in this embodiment.

Figure 4:
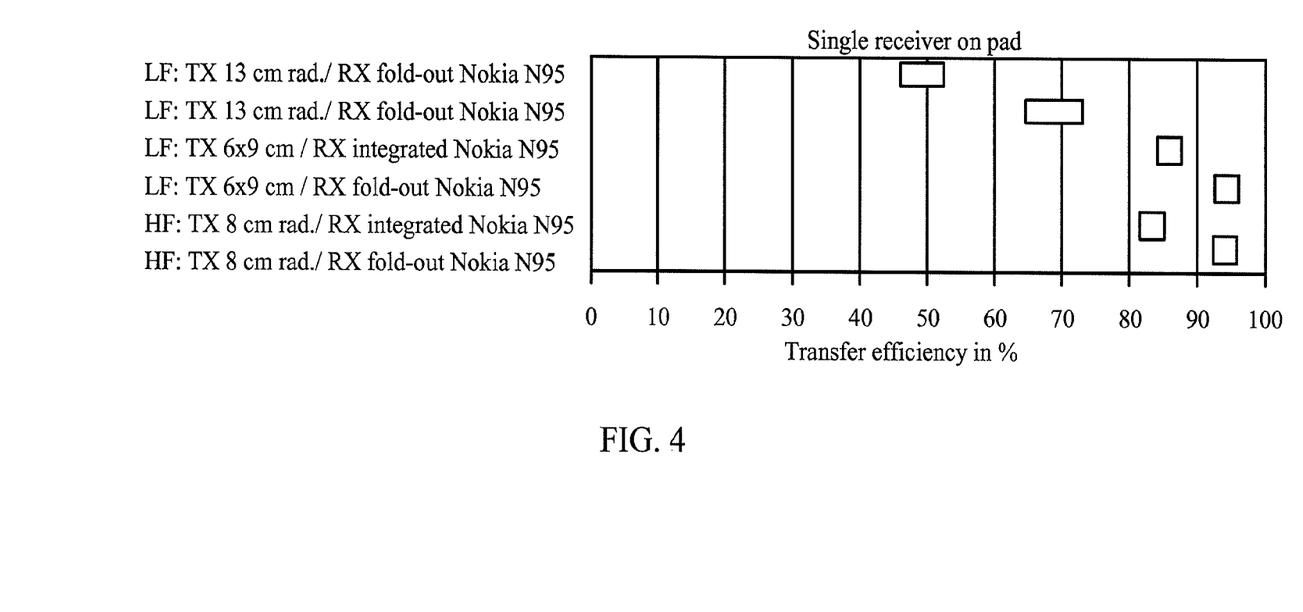
FIG. 4 shows efficiencies for the single receivers.

The efficiency results for these devices are shown in FIG. 4, which shows how the different size devices can be located on the different size pads. Five of the six situations have efficiencies which are greater than 80%. Even the lowest efficiency, created by a large pad with an integrated receiver in the phone, had a transfer efficiency of 50%.

Another embodiment shown in FIGS. 5A-5D may use multiple receivers all on the same pad. Since the pads, especially the large and medium pads, have sizes that are large enough to physically hold multiple different phones, multiple different devices can be placed all on the pad.

Figure 5A:
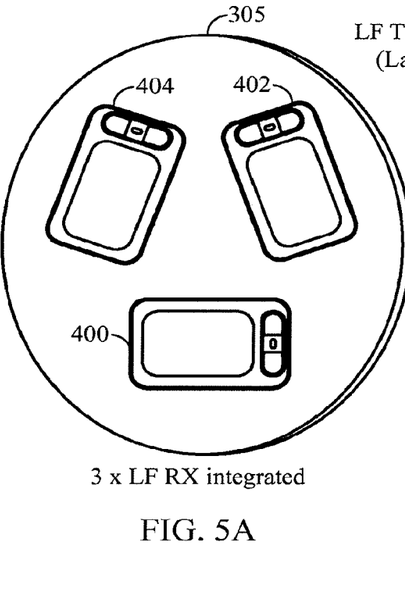
FIGS. 5A-5D show pads with multiple receivers.

FIGS. 5A-5D illustrates these different embodiments. In FIG. 5A, the pad 305 includes three PDA phones/devices thereon, shown as 400, 402 and 404; however, the pad may include more or fewer devices.

Figure 5B:
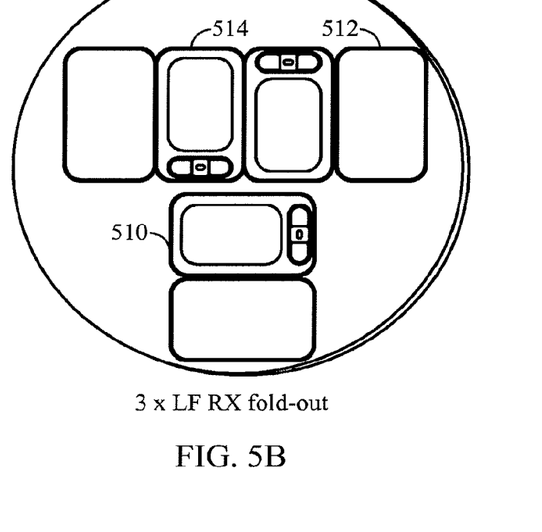

In the FIG. 5B embodiment, the devices have foldout antennas, with the devices 510, 512 and 514 each representing a PDA on the pad, along with its foldout flat against the pad and away from the body of the phone.

Figure 5C:
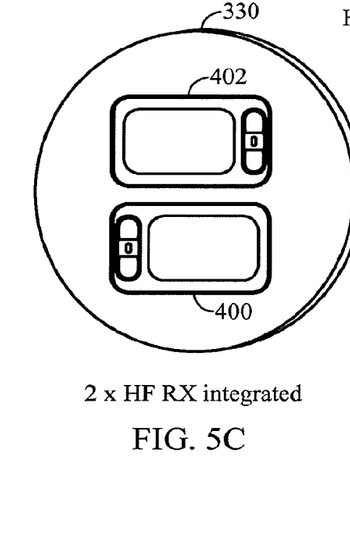
Figure 5D:
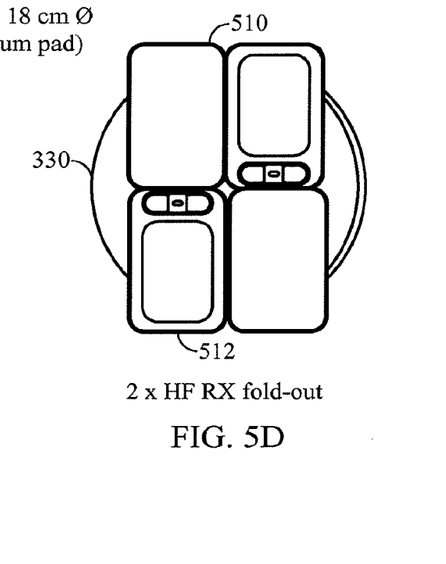

FIG. 5C shows the medium pad 330 with two phones thereon, 400, 402, while FIG. 5B shows this same pad with two foldouts thereon 510, 512.

Figure 6:
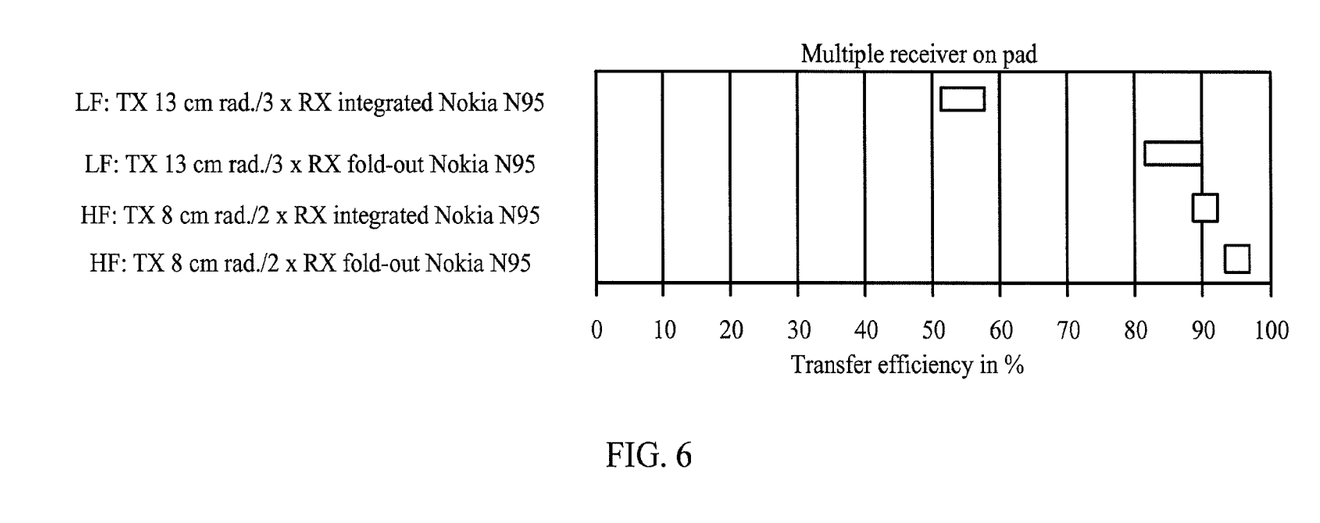
FIG. 6 shows transfer efficiencies for the multiple receivers.

FIG. 6 shows the measured efficiency of this system, with again most of the efficiencies being greater than 80%.

The efficiency of the system $\eta_a$ can be calculated as the input power across the terminals 215 divided by receive power across the terminals 248 or $\eta_a = P_r/P_t$.

Figure 8:
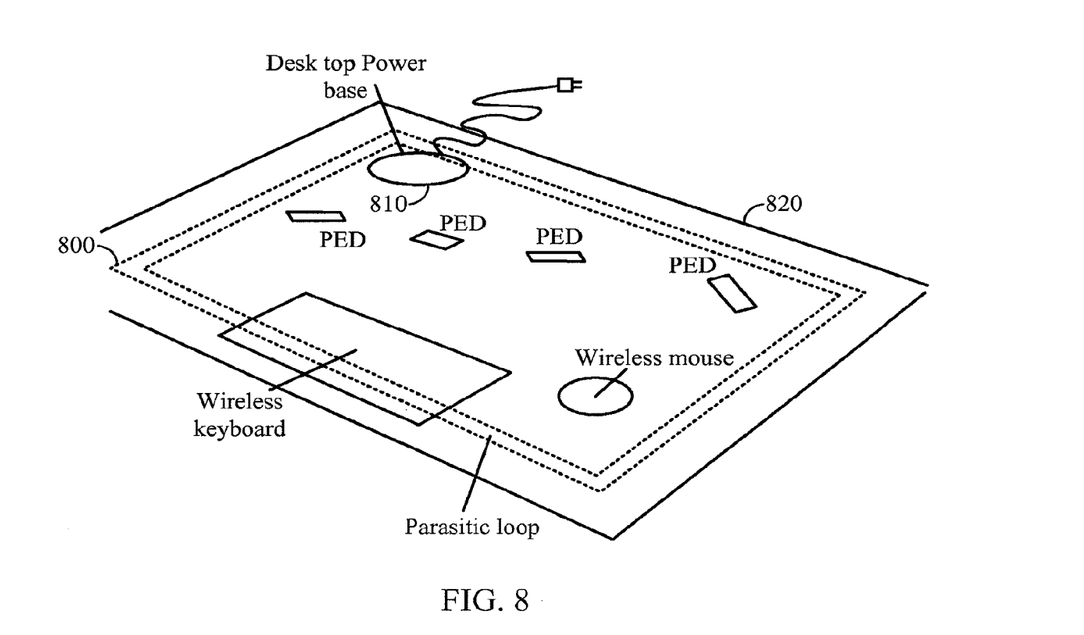
FIG. 8 shows a desktop parasitic.

Another embodiment shown in FIG. 8 forms a power relay as a parasitic antenna that improves coupling between energy source and energy sink. The energy source is formed of a resonant antenna 810, which may be a resonant capacitor and inductor. A parasitic antenna 800, which may also be resonant at the same frequency, may be used. This parasitic antenna may be expanded to cover a large portion of the desktop area 820 as shown. Such a parasitic loop may either be mounted beneath the desk, or built into the desktop surface, or put on the desk's surface e.g. as a flat structure, such as a desk mat. The parasitic device can be excited by a single and small active power base, and can be used to dramatically improve performance and efficiency of wireless desktop powering and charging in that area.

Inductive excitation from a small power base may however be a convenient solution since it does not require integration of any part. This becomes particularly true when the parasitic antenna is invisibly integrated into the desktop. FIG. 8 illustrates a large parasitic loop thereby improving the coupling between power base and receiver devices. The parasitic loop can cover an entire desk surface, providing a hot zone throughout that desk surface. The parasitic antenna, in this embodiment, provides passive repeating of power to the entire desktop area.

The same kind of antenna, in another embodiment, may also be driven directly from a transmitter unit.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. An apparatus configured to transmit power via a magnetic field, the apparatus comprising:
    an antenna circuit configured to inductively transmit power via the magnetic field at a magnetic field strength level sufficient to charge or power a receiver device;
    a proximity detector configured to detect a proximity of a presence of a living being within a region of the magnetic field in which power is inductively transmitted at the magnetic field strength level; and
    a controller configured to control the antenna circuit to adjust the magnetic field strength level in response to detecting the presence of the living being within the region of the magnetic field.

2. The apparatus of claim 1, further comprising an input mechanism configured to receive manual input from the living being, the input mechanism configured to activate the proximity detector in response to receiving the manual input.

3. The apparatus of claim 1, further comprising a driver circuit configured to drive the antenna circuit at a frequency substantially equal to a resonant frequency of the antenna circuit, and wherein the frequency is substantially equal to a resonant frequency of a receive antenna circuit of the receiver device.

4. The apparatus of claim 1, wherein the proximity detector comprises an infrared sensor.

5. The apparatus of claim 1, wherein the controller is configured to control the antenna circuit to reduce the magnetic field strength level to at least one of a lower magnetic field strength level or substantially zero.

6. The apparatus of claim 5, wherein the lower magnetic field strength level corresponds to a level configured to avoid biological harm to the living being.

7. The apparatus of claim 1, wherein the region corresponds to a near-field of the antenna circuit.

8. A method of transmitting power via a magnetic field, the method comprising:
    inductively transmitting, at an antenna circuit, power via the magnetic field at a magnetic field strength level sufficient to charge or power a receiver device;
    detecting a proximity, via a proximity detector, of a presence of a living being within a region of the magnetic field in which power is inductively transmitted at the magnetic field strength level; and
    controlling the antenna circuit to adjust the magnetic field strength level in response to detecting the presence of the living being within the region of the magnetic field.

9. The method of claim 8, further comprising receiving manual input from the living being via an input mechanism and activating the proximity detector in response to receiving the manual input.

10. The method of claim 8, wherein the proximity detector comprises an infrared sensor.

11. The method of claim 8, wherein adjusting controlling the magnetic field strength level comprises controlling the antenna circuit to reduce the magnetic field strength level to at least one of a lower magnetic field strength level or substantially zero.

12. The method of claim 11, wherein the lower magnetic field strength level corresponds to a level configured to avoid biological harm to the living being.

13. An apparatus configured to transmit power via a magnetic field, the apparatus comprising:
    means for inductively transmitting power via the magnetic field at a magnetic field strength level sufficient to charge or power a receiver device;
    means for detecting a proximity of a presence of a living being within a region of the magnetic field in which power is inductively transmitted at the magnetic field strength level; and
    means for controlling the transmitting means to adjust the magnetic field strength level in response to detecting the presence of the living being within the region of the magnetic field.

14. The apparatus of claim 13, further comprising means for receiving manual input from the living being and means for activating the means for detecting in response to receiving the manual input.

15. The apparatus of claim 13, wherein the means for detecting the proximity of the living being comprises an infrared sensor.

16. The apparatus of claim 13, wherein the controlling means comprises means for controlling the transmitting means to reduce the magnetic field strength level to at least one of a lower magnetic field strength level or substantially zero.

17. The apparatus of claim 1, wherein the controller is further configured to control the antenna circuit to decrease the magnetic field strength level to a lower magnetic field strength level sufficient to charge or power the receiver device in response to detecting the presence of the living being within the region of the magnetic field.

18. The apparatus of claim 17, wherein the controller is further configured to control the antenna circuit to increase the second magnetic field strength level in response to detecting an absence of the person in proximity of the region of the magnetic field.

19. The apparatus of claim 1, wherein the controller is further configured to cause the receive device to stop receiving the transmitted power.

* * * * *